United States Patent
Heien

(10) Patent No.: US 6,609,719 B2
(45) Date of Patent: Aug. 26, 2003

(54) WALKER AND WHEEL ASSEMBLY THEREFOR

(76) Inventor: Troy A. Heien, 5704 S. View Rd., Laramie, WY (US) 82070

(*) Notice: Subject to any disclaimer, the term of this patent is extended or adjusted under 35 U.S.C. 154(b) by 0 days.

(21) Appl. No.: 10/078,403

(22) Filed: Feb. 21, 2002

(65) Prior Publication Data

US 2002/0074747 A1 Jun. 20, 2002

Related U.S. Application Data

(63) Continuation-in-part of application No. 09/630,566, filed on Aug. 3, 2000, now Pat. No. 6,357,765.

(51) Int. Cl.[7] ................................. B62B 5/02
(52) U.S. Cl. .................. 280/5.26; 137/67; 280/87.021; 301/5.23
(58) Field of Search ............... 280/5.2, 5.26, 280/87.051, 87.041, 87.021, 5.24, 5.28, DIG. 10, 29, 11.222, 11.231; 301/5.23, 1, 5.1; 135/67, 66, 76, 78; 297/5, 6; 16/18 B, 18 R, 45; 188/1.12; D8/375

(56) References Cited

U.S. PATENT DOCUMENTS

| 722,433 | A | * | 3/1903 | Ritchie | 280/261 |
|---|---|---|---|---|---|
| 795,620 | A | * | 7/1905 | Jones | 301/5.23 |
| 1,305,535 | A | * | 6/1919 | Gabowiecki | 16/45 |
| 1,326,679 | A | * | 12/1919 | Macbeth | 301/5.23 |
| 1,448,783 | A | * | 3/1923 | Blewitt et al. | 135/67 |
| 1,887,427 | A | * | 11/1932 | Porcello | 280/10 |
| D181,957 | S | * | 1/1958 | Callahan | 297/5 |
| 3,208,544 | A | * | 9/1965 | Colvin | 180/10 |
| 3,272,888 | A | * | 9/1966 | Burns | 585/731 |
| 4,387,891 | A | * | 6/1983 | Knochel | 135/67 |
| 4,512,588 | A | * | 4/1985 | Cox | 180/8.2 |
| D309,254 | S | * | 7/1990 | Guile | 16/45 |
| 5,112,044 | A | * | 5/1992 | Dubats | 135/85 |
| 5,603,517 | A | * | 2/1997 | Lorman | 135/67 |
| 5,720,529 | A | * | 2/1998 | Barron | 301/5.23 |
| 6,357,765 | B1 | * | 3/2002 | Heien | 280/5.2 |

FOREIGN PATENT DOCUMENTS

| DE | 2135848 | * | 2/1973 |
|---|---|---|---|
| FR | 672078 | * | 12/1929 |
| FR | 2646329 | * | 4/1989 |
| FR | 2640204 | * | 6/1990 |
| NL | 6409073 | * | 7/1965 |

* cited by examiner

*Primary Examiner*—Anne Marie Boehler
(74) *Attorney, Agent, or Firm*—Roland H. Shubert

(57) ABSTRACT

A walker includes a frame with downwardly extending front and rear legs. An obstacle traversing wheel assembly is disposed at the lower end of each front leg, and a wheel having a brake that is engaged by a downward force on the walker frame is disposed at the lower end of each rear leg. The obstacle traversing wheel assembly is arranged with a primary wheel that is rotatable about a central axis. At least four secondary wheels of equal diameter, but smaller than the primary wheel, are arranged at fixed locations around the circumference of the primary wheel. The secondary wheels are arranged to freely rotate independently of each other and of the primary wheel.

20 Claims, 11 Drawing Sheets

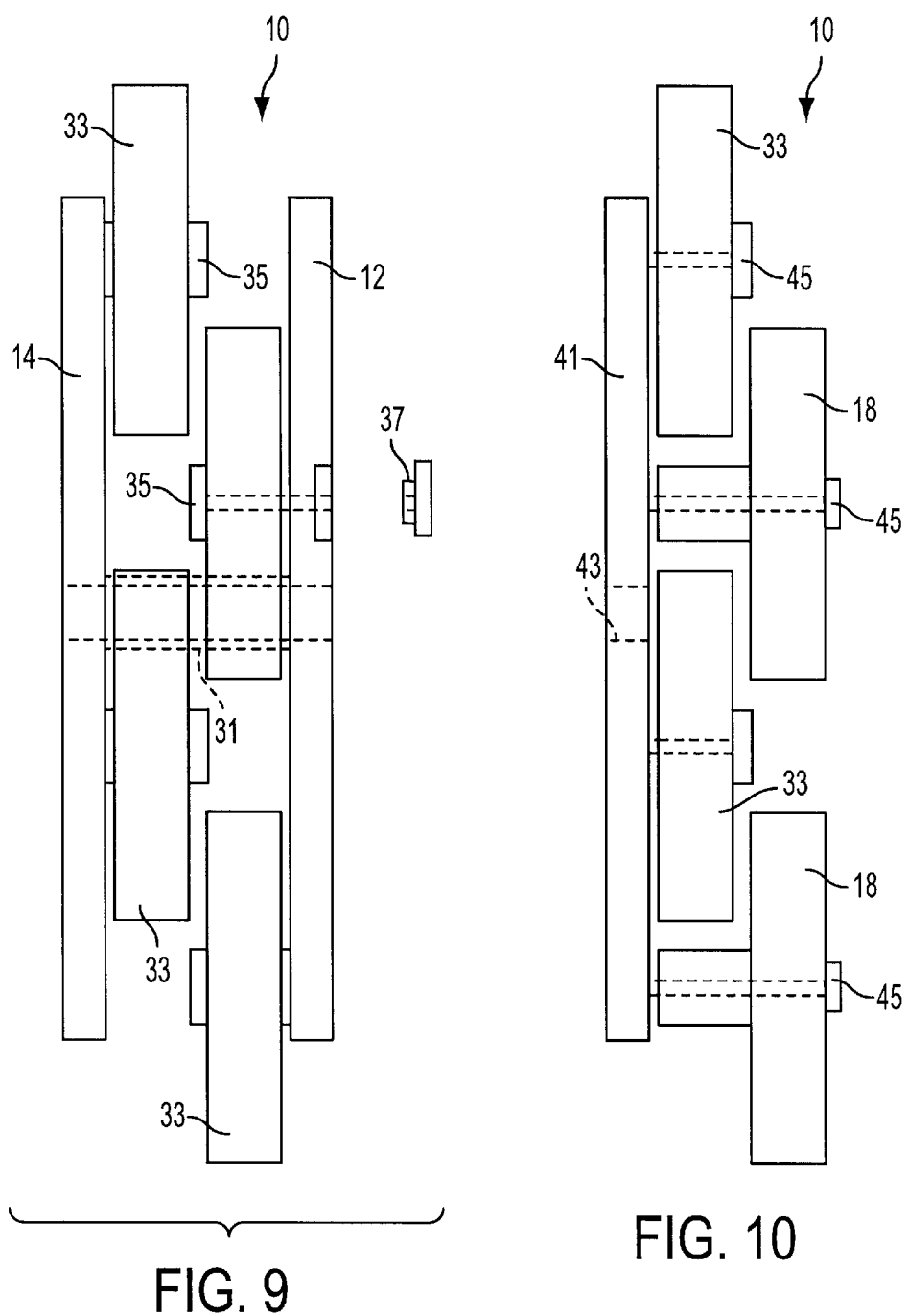

US 6,609,719 B2

WALKER AND WHEEL ASSEMBLY THEREFOR

This application is a continuation-in-part of U.S. patent application Ser. No. 09/630,566 that was filed on Aug. 3, 2000 now U.S. Pat. No. 6,357,765.

TECHNICAL FIELD

This invention relates to an improved walker for use by persons having physical disabilities.

More specifically, this invention relates to an improved and safer walker having wheel assemblies that can traverse rough surfaces and roll over small obstacles without wheel drag. In a preferred embodiment of this invention, braking means that are activated by a downward pressure applied by the user are also provided.

BACKGROUND ART

Walkers are commonly used as a support by many of the frail aged and other persons with physical disabilities while they are moving from place to place. One typical walker in use today consists of a generally rectangular, tubular frame having four legs and open at the rear. In some variations of that walker design, all four legs terminate in caps or buttons that slide along or otherwise engage the floor or other walking surface. The invalid walker described in U.S. Pat. No. 4,922,940 is of such design, In another design variation, the two front walker legs are provided with wheels while the floor engaging ends of the rear legs terminate in a cap or button that slides along the floor or other surface as the user moves with the walker. The rear legs of this walker design tend to catch on minor surface irregularities and require the user to lift the rear of the walker to advance it, a task that often is difficult for many users. One approach to solving that problem has been to provide wheels on the rear walker legs as well as on the front. A full-wheeled walker is easier for a user to advance but also tends to be less stable, particularly when the user attempts to use the walker to aid or regain balance. That instability problem, in turn, has promoted efforts to provide a variety of braking systems that either act upon one or more of the walker wheels or rely upon an appendage to contact and drag along the floor or other walking surface. Examples of full-wheeled walkers that also incorporate a braking system include those described in U.S. Pat. Nos. 5,020,560 and 6,068,273.

None of the prior art walkers provide wheel means that can smoothly traverse small obstructions such as carpet edges, elevator doorways electrical cords, twigs and small branches, gravel, sidewalk irregularities and the like, and provide brake means that are intuitively and automatically operated by the user. This invention fills those needs.

SUMMARY OF THE INVENTION

The walker of this invention includes a generally rectangular three-sided frame, open at the back, and having a plurality of downwardly extending legs, each leg having a surface engaging wheel means at its lower end. Each of the forward, or front, wheel means comprise an obstacle traversing wheel assembly having at least one primary member that is rotatable about a central axis. At least four smaller secondary wheels of equal diameter are mounted on axles attached around the circumference of the primary member at fixed locations equidistant from each other and from the central axis. Each secondary wheel has a diameter that is greater than is the distance between adjacent wheel locations, and each is free to rotate about its axis. Each rear walker leg may have a wheel mounted at the lower end thereof and, in a preferred embodiment, each rear wheel includes a braking means that is activated by a downward pressure placed upon the walker frame by the user.

Hence, it is an object of this invention to provide a walker that rolls easily over small obstacles and is more maneuverable than are walkers of conventional design.

It is another object of this invention to provide a full-wheeled walker having brake means that are activated by a downward pressure applied to the walker frame by the user.

Other objects and advantages of this invention will become evident from a study of the following description and accompanying drawings.

BRIEF DESCRIPTION OF DRAWINGS

FIG. 9 is an end-on view showing a fourth embodiment of the wheel assembly that may be used with the front legs of the FIG. 1 walker;

FIG. 10 is an end-on view showing a fifth embodiment of the wheel assembly that may be used with the front legs of the FIG. 1 walker;

DESCRIPTION OF THE INVENTION

Figure 1:
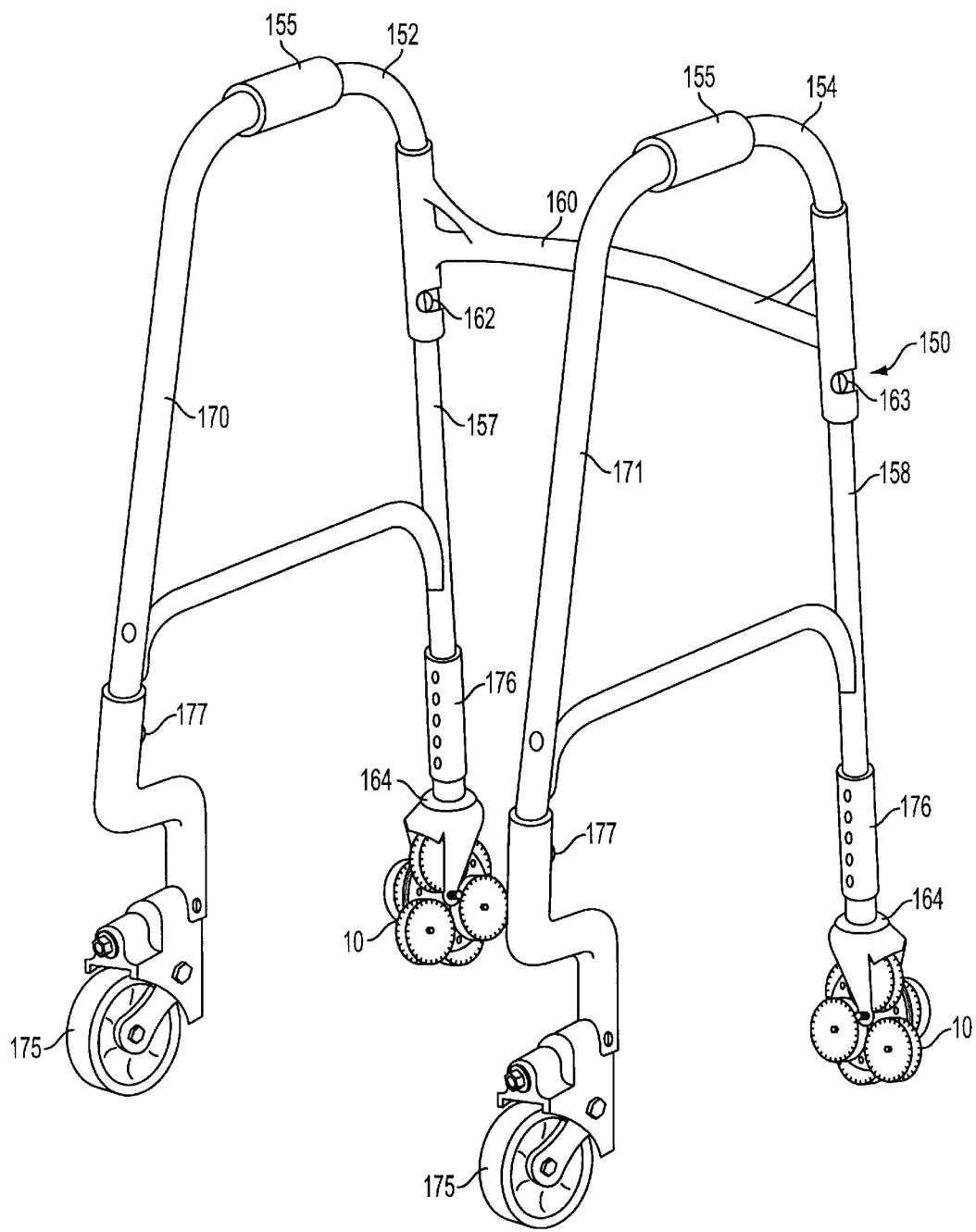
FIG. 1 is an oblique view of the walker and compound wheel assembly of this invention.

FIG. 1 illustrates a walker 150 that is constructed according to this invention. Walker 150 includes a frame that conveniently may comprise a generally A-shaped left side member 152 and a corresponding A-shaped right side frame member 154. Each side member includes a generally horizontal top section that is provided with user handholds 155. Front frame leg 157 of left side member 152 and front frame leg 158 of right side member 154 are held in a rigidly spaced apart attitude by means of front frame member 160. Member 160 may be provided with locking means 162 and 163 to secure the frame in its operating position and to also allow rotational movement of the front frame legs 157 and 158 relative to member 160 so that the frame may be folded to a storage or transport position. An obstacle traversing wheel assembly 10 is mounted at the bottom of each front frame leg 157 and 158. It is preferred that wheel assembly 10 be mounted to the frame legs through swivel connection 164 that allows assembly 10 to freely rotate about the axis of the leg member. The side members 152 and 154 also include rear leg members 170 and 171. In a preferred embodiment of this invention, a wheel and brake assembly 175 is mounted at the bottom of each rear leg member. In a preferred embodiment, frame height adjustment means 176 and 177 are provided to allow fitting of the walker height to that of the user.

Figure 2:
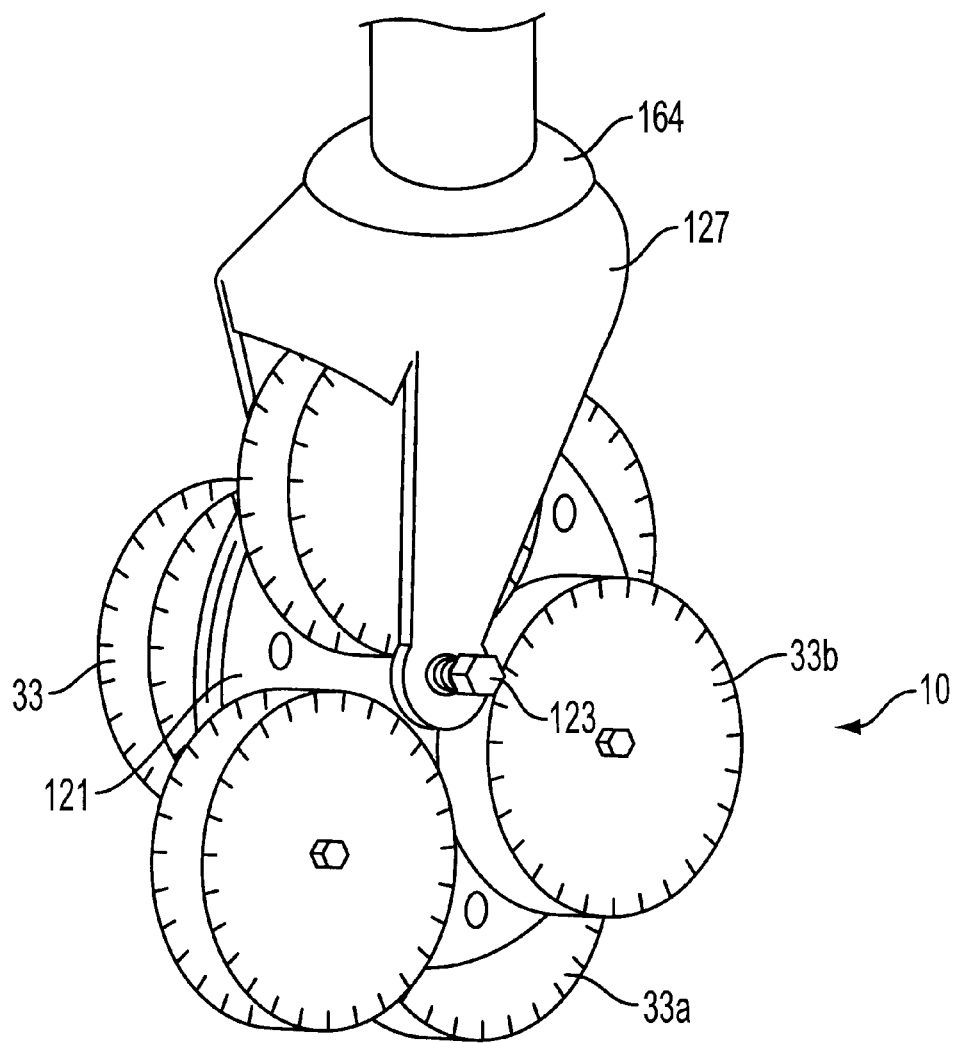
FIG. 2 is an oblique view of a first embodiment of the compound wheel assembly used with the front legs of the FIG. 1 walker.
Figure 3:
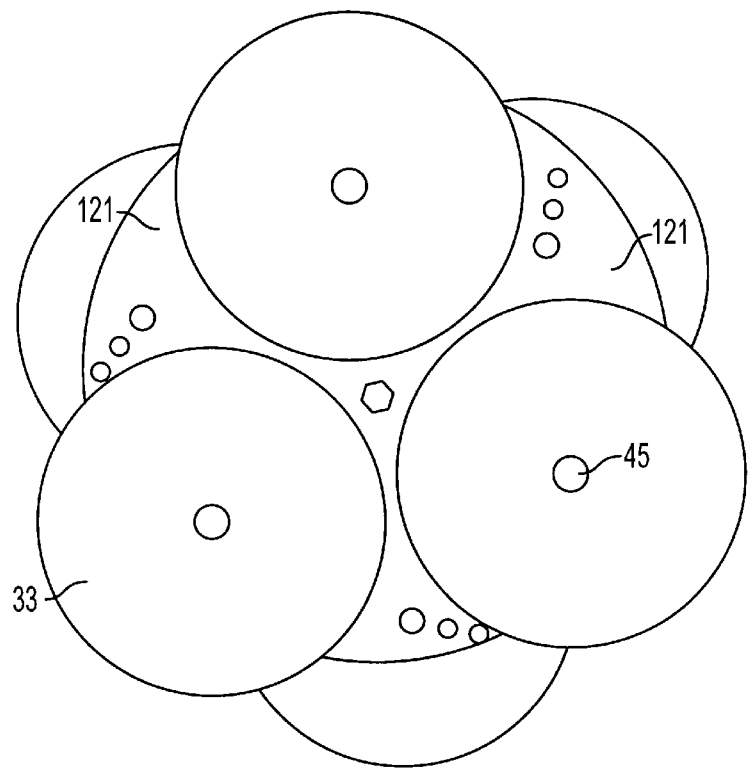
FIG. 3 is a stylized side view of the wheel assembly of FIG. 2.
Figure 4:
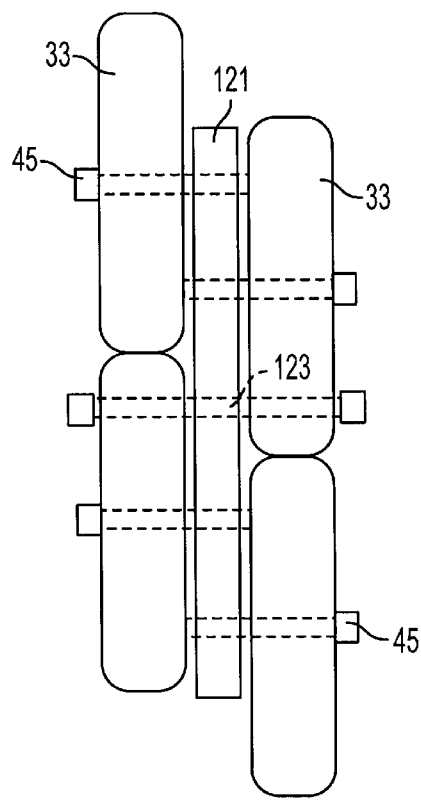
FIG. 4 is an end-on view of the wheel assembly of FIG. 3.
Figure 11:
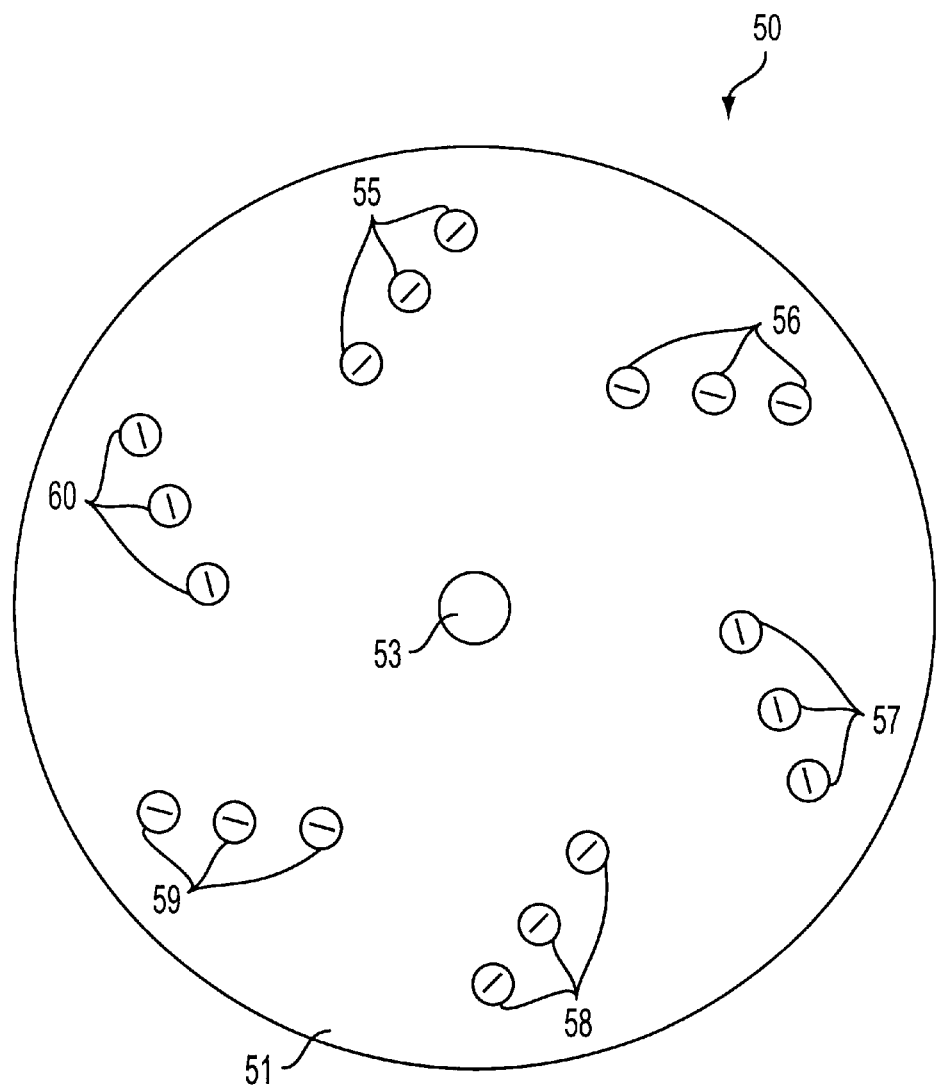
FIG. 11 shows a wheel holder plate that may be used in the FIG. 2, FIG. 7, or FIG. 9 wheel embodiments.

Referring now to FIGS. 2, 3 and 4, there is shown a first embodiment of the obstacle traversing wheel assembly 10. This embodiment of wheel assembly 10 includes a wheel holder that is constructed of a flat, circular plate 121 having a centered bore for the passage of an axle 123 about which the plate rotates. Plate 121 may alternatively comprise wheel holder 50 that is shown in FIG. 11. An even number of secondary wheels 33, preferably six or eight, are mounted upon plate 121 by means of stub axles 45 at locations that are angularly equidistant from each other and from axle 123. Adjacent wheels 33a, 33b, are mounted on opposite sides of plate 121. Individual wheel assemblies 10 are attached to the front frame legs through yoke 127 and swivel connection 164. FIG. 3 is a stylized side view of the FIG. 2 wheel assembly showing with more clarity the arrangement of the secondary wheels 33 as mounted upon plate 121 while FIG. 4 is an end-on view of the same wheel assembly.

Figure 5:
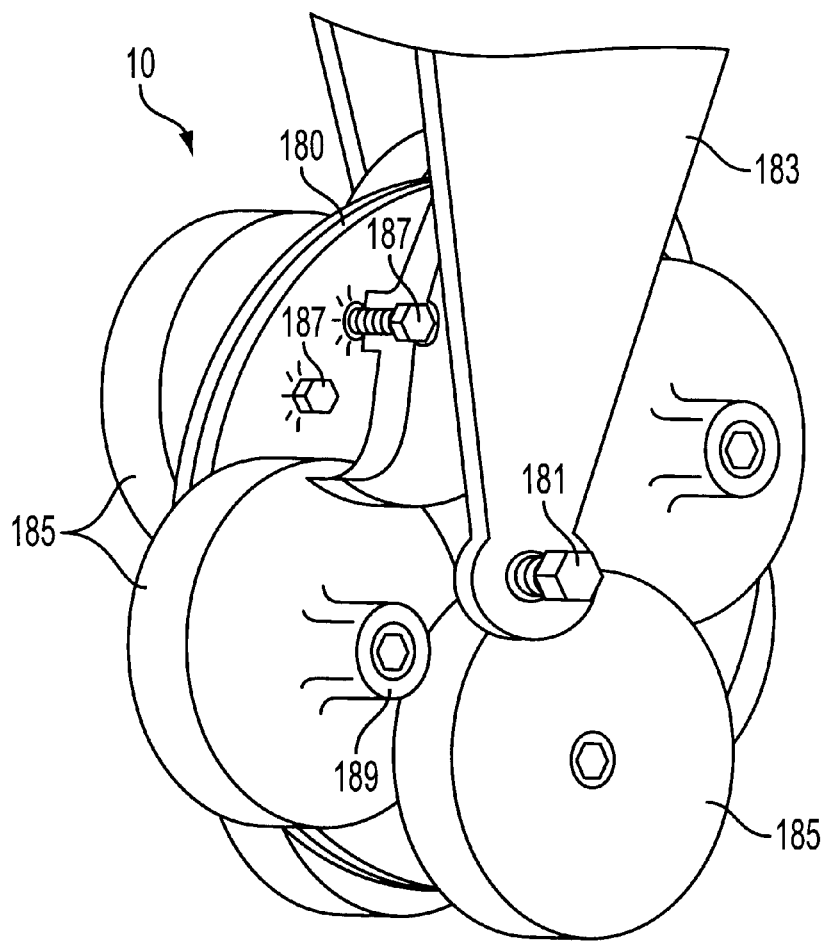
FIG. 5 is an oblique view of a second embodiment of the compound wheel assembly used with the front legs of the FIG. 1 walker.
Figure 6:
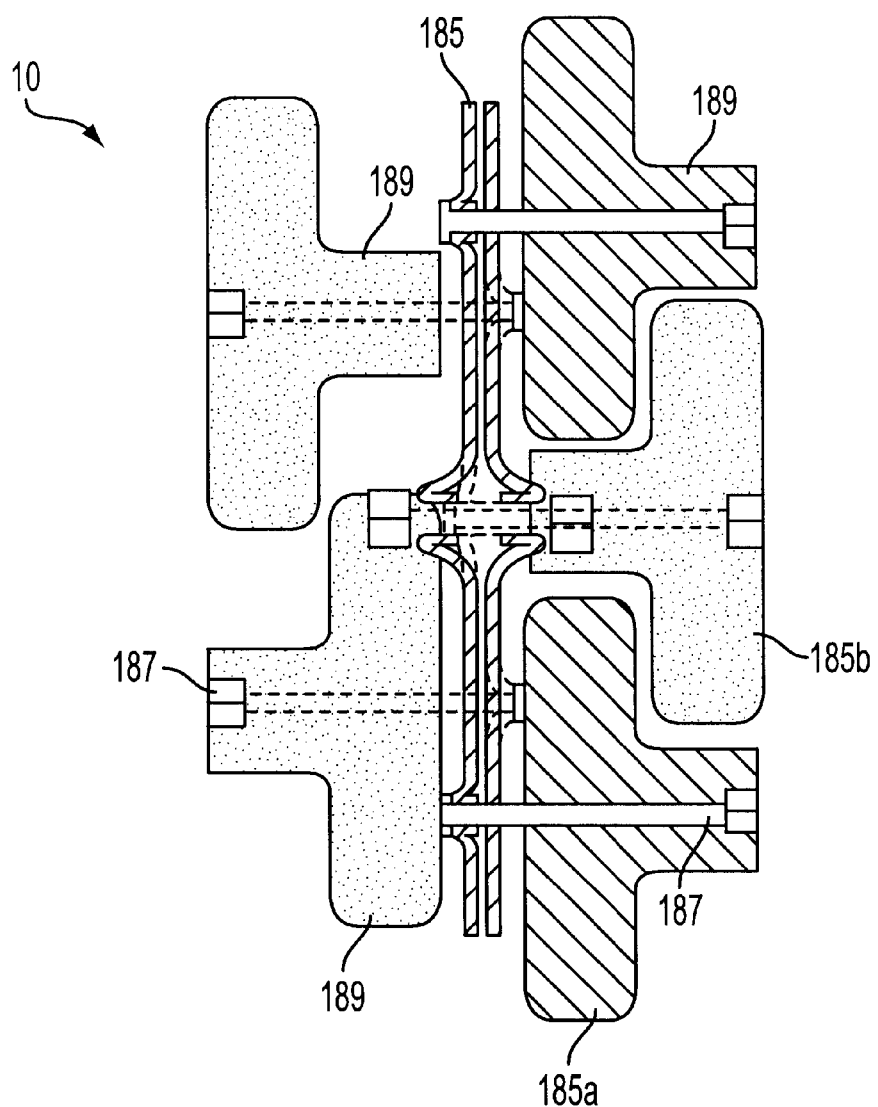
FIG. 6 is a front, partial sectional view of the wheel assembly of FIG. 5.

Referring now to FIGS. 5 and 6, there is shown a second embodiment of the compound wheel assembly 10 that forms a part of this invention. That wheel embodiment employs a central wheel holder 180 that may be a unitary plate or may be formed as a mirror image pair of thinner plates as is best seen in the cross-sectional view of FIG. 6. Wheel holder 180 is provided with a centered bore to allow free rotation about an axle 181 that extends between the arms of a yoke 183 which in turn may be mounted to the front walker legs 157 and 158 through swivel connection 164.

An even number of secondary wheels 185, conveniently six or eight, and preferably eight, are mounted from wheel holder 180 by means of stub axles 187 that extend outwardly perpendicular to the plane of wheel holder 180. Half of the secondary wheels are mounted on one side of wheel holder 180 and half on the other side. As may be seen in the partial cut-away view of FIG. 5 as well as in FIG. 6, the secondary wheels 185 of each wheel holder side are all of the same diameter and are mounted at locations on holder 180 that are angularly equidistant apart and equidistant as well from the center of plate 180. Also, the wheel locations are spaced apart a distance that is less than the diameter of the secondary wheels, thus causing adjacent wheels to overlap. The secondary wheels 185 on one side of wheel holder 180 are mounted at locations that bisect the angle between adjacent wheels on the other side of holder 180 as is best seen in FIG. 5.

Each secondary wheel is allowed to independently rotate and, in order to achieve that result, adjacent wheels 185a, 185b (FIG. 6) on the same side of wheel holder 180 must follow a separate track that is spaced apart a distance that is at least slightly greater than is the thickness of the wheel. There results an overlapping arrangement in which the secondary wheels, in total, follow along four adjacent and parallel tracks, two parallel tracks on each side of holder 180. Note, however, only three wheels in three separate tracks are in contact with the ground or other supporting surface at any one time. That overlapping arrangement is obtained by providing spacer means that position individual wheels at different locations along the stub axles. That spacer means may comprise a thick washer or bushing, but preferably is formed as a cylindrical boss that projects coaxially outwardly from one side of wheel 185. The height of boss 189 must be somewhat greater than is the thickness of the wheel to allow free rotation of each wheel when it is mounted upon holder 180. The wheels are arranged on holder 180 with the boss 189 of adjacent wheels alternating in direction, first toward the holder and next away from the holder.

Figure 7:
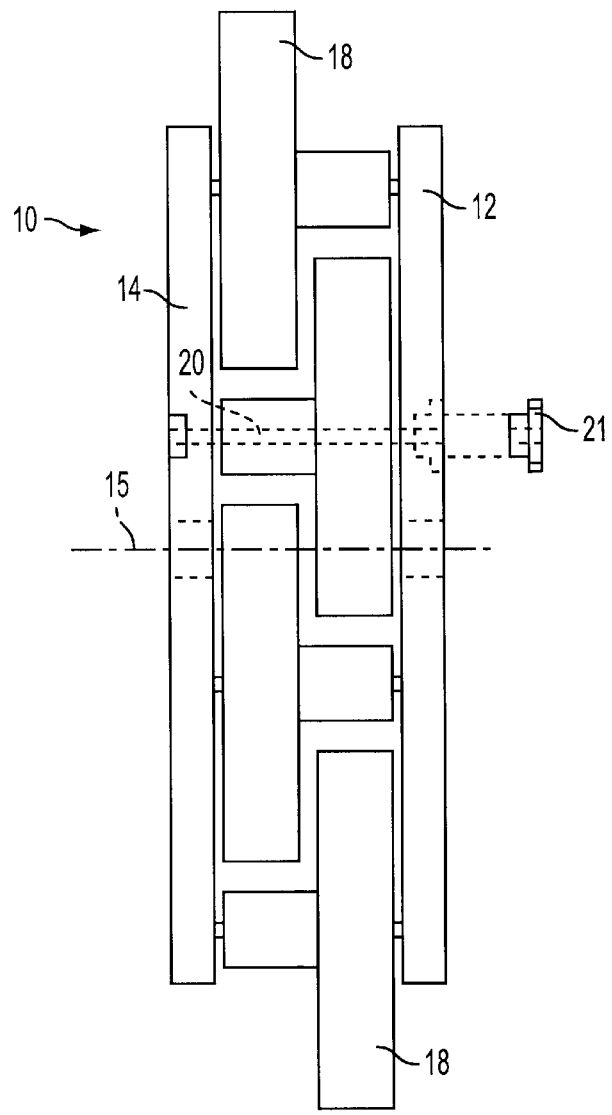
FIG. 7 is an end-on view of a third embodiment of the wheel assembly that may be used with the front legs of the FIG. 1 walker.
Figure 8:
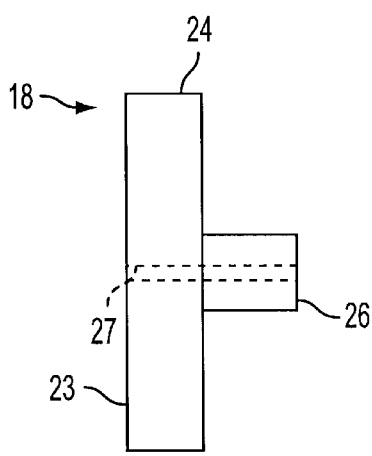
FIG. 8 is a detail view of a secondary wheel used in the embodiment of FIG. 7.

A third embodiment of the wheel assembly 10 that forms a part of this invention is illustrated in FIGS. 7 and 8. Referring now to those Figures, assembly 10 includes a primary wheel comprising a pair of wheel holders 12 and 14 arranged to rotate about a central axis 15. Wheel holders 12 and 14 preferably are formed a two parallel, spaced apart, generally circular, plate-like members having a central bore to accommodate an axle about which the primary wheel rotates. At least four secondary, equal diameter, wheels 18 are rotatably mounted between holders 12 and 14 by means of a journaled axle 20 extending between holders 12 and 14 and secured in place by a nut or other locking means 21. Wheels 18 are spaced apart a distance that is less than one wheel diameter, and are located at fixed points that are equidistant from each other and from axle 20.

In this embodiment, secondary wheels 18 may be configured as shown in the view of FIG. 8. Wheel 18 of FIG. 8 includes a circular disk-like portion 23 having a generally flat or textured edge bearing surface 24. A cylindrical boss 26 projects coaxially outward from one side of disk portion 23 for a distance somewhat greater than the thickness of disk portion 23. A bore 27, to accept axle 20, extends axially through both boss 26 and disk portion 23. Wheels 18 are then arranged in assembly 10 with boss 26 of adjacent wheels alternating in direction as is shown to provide clearance for the overlap between the disk portion 23 of adjacent wheels. The wheels may be machined from circular stock of a suitable material or preferably may be molded from a construction plastic such as polyurethane.

FIG. 9 illustrates another embodiment of wheel assembly 10. This embodiment may use the same wheel holders 12 and 14 as does the embodiment of FIG. 7. However, in this embodiment the two wheel holders are secured one to the other in a held apart relationship by way of a cylindrical spacer and bearing member 31 disposed axially between the two wheel holders. Wheels 33 of this embodiment are disk shaped without the projecting boss of wheels 18. The wheels 33 are mounted on stub axles 35 that extend inwardly from the wheels holders 12 and 14, and are arranged so that adjacent wheels are journaled one from holder 12 and the next from holder 14. Axles 35 are secured to the wheel holders as by locking nut 37 or other suitable means. As with the embodiment of FIG. 7, wheels 33 are located at fixed points equidistant one from the other and from the center of bearing member 31 at a distance less than the diameter of the wheels.

Yet another embodiment of the wheel assembly is illustrated in FIG. 10. That embodiment employs but a single wheel holder 41 that is provided with a central bore 43 journaled for rotation about a shaft or axle. An even number of stub axles 45, one for each wheel, are fixed to holder 41 and the disk-like wheels 33 of the FIG. 9 embodiment are mounted on the axles alternating with the wheels 18 of FIG. 7 to thereby obtain an overlapping arrangement as is shown. As in the embodiments of FIGS. 7 and 9, wheels 33 and 18 are all the same diameter and are equi-spaced, one from another, at a distance less than that of the wheel diameter.

FIG. 11 illustrates a wheel holder 50 that may be used in any of the FIG. 2, FIG. 7, FIG. 9 or FIG. 10 embodiments. Holder 50 comprises a flat, generally circular plate 51 having a centered bore 53 to allow rotation of the wheel holder about an axle. Plate 51 is provided with a plurality of equi-spaced, grouped openings 55, 56, 57, 58, 59 and 60, each opening adapted for the mounting of a stub axle therein. As shown in FIG. 11, each group of openings comprises a plurality, suitably three, axle accepting holes bored through plate 51 at differently spaced radial distances from the central bore 53. The outermost holes of each grouping are spaced apart an equal distance one from another, and from central bore 53 as well. A similar relationship holds between the center and innermost holes of each grouping. It is preferred that the holes of each grouping not be located along a common radial line of plate 51 in order to obtain maximum structural strength. That arrangement allows installation of different sized groups of secondary wheels onto the same wheel holders.

Figure 12:
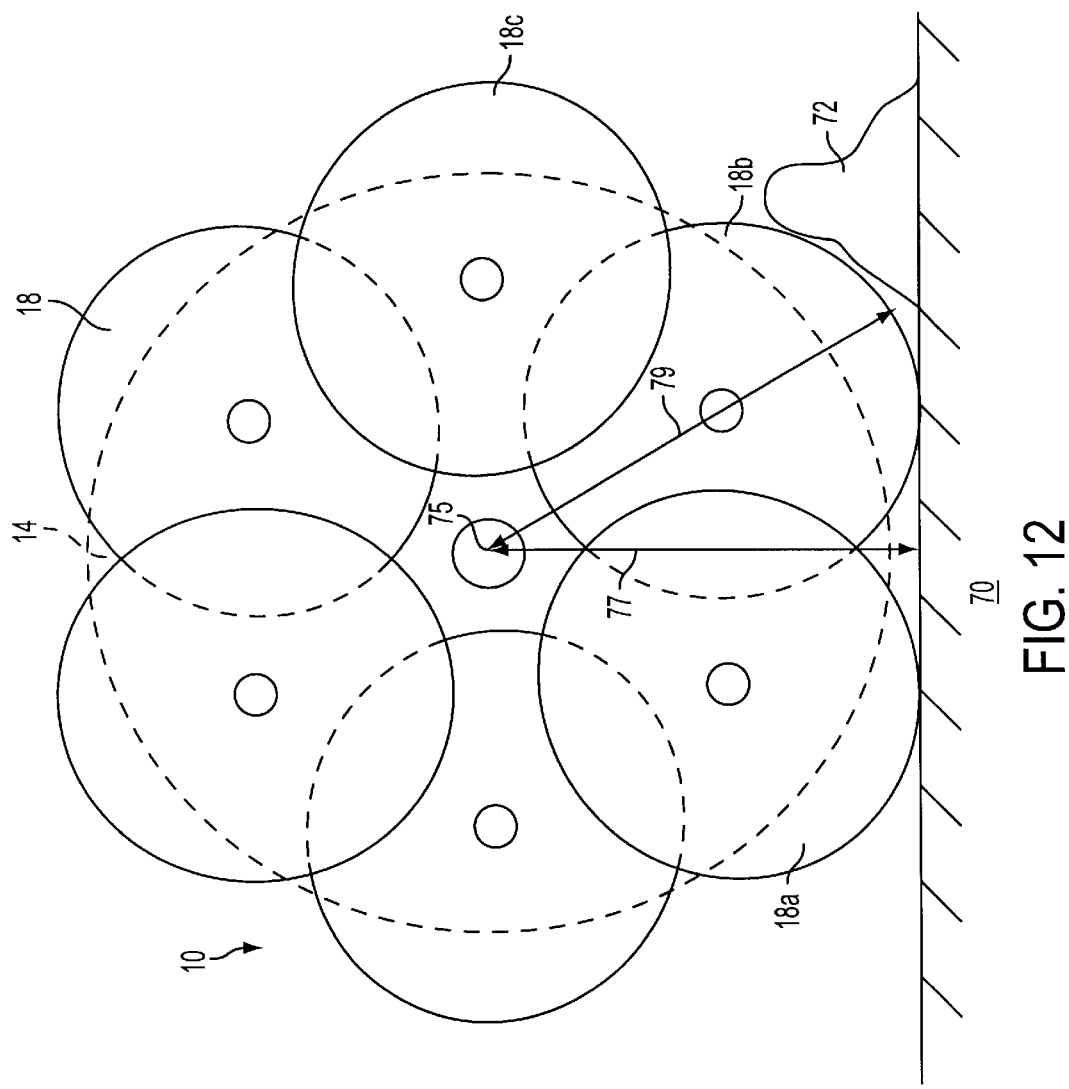
FIG. 12 is a partially broken away view illustrating the manner in which the compound wheel assemblies roll over an obstruction.

The various embodiments of the wheel assembly 10 easily surmount and roll over obstructions that cause a conventional wheel to stall and drag. The manner in which the wheel assembly operates to achieve that result is explained in greater detail with reference to FIG. 12. Referring now to that Figure, there is shown a partially broken away side view of the wheel assembly 10 rolling along a surface 70 as it bumps into obstruction 72. Obstruction 72 typically might be an electrical cord or pneumatic line lying on a workplace floor, an elevator door sill, a small stone or branch on a parking lot or pavement surface, or an irregularity in a sidewalk. As assembly 10 moves to the right along an unobstructed surface only the lowermost two, 18a and 18b, of the secondary wheels are in rolling contact with surface 70. The remaining secondary wheels and the primary wheel are motionless. As secondary wheel 18b strikes obstruction 72 it stalls and causes a rightward rotational tilt of the entire wheel assembly 10, bringing secondary wheel 18c downward to roll over obstruction 72. The force required to cause that rotational tilt is modest, amounting to little more than the force required to lift the wheel assembly (and the weight that it supports) a short distance. That distance comprises a span amounting to the difference in distance 77 between the centerpoint 75 of wheel assembly 10 and surface 70 and the longest distance 79 between centerpoint 75 and the circumference of the wheel 18b in contact with the obstruction 72. Distance 77 may be considered as being the effective radius of the wheel assembly, and twice that distance then constitutes the effective diameter of the wheel assembly. As may now be appreciated, the structure of the wheel assembly allows it to literally walk over small obstructions.

As has been set out before, the wheel assembly of this invention requires a minimum of four secondary wheels equi-spaced around the circumference of a primary wheel means. Because the diameter of each secondary wheel is greater than is the distance between wheels, adjacent wheels overlap and are offset one to another. Thus, when the wheel assembly traverses a surface, the two wheels in contact with that surface follow separate but parallel tracks, one wheel in each track. That geometry, separate and parallel tracking of adjacent wheels, tends to increase the stability of a wheel assembly that is pivotally attached to a load-supporting frame through a conventional yoke or horn arrangement. It can further be appreciated that the overlapping arrangement of adjacent secondary wheels can best be obtained through use of an even number of secondary wheels, preferably four, six or eight, and most preferably six or eight.

Figure 13:
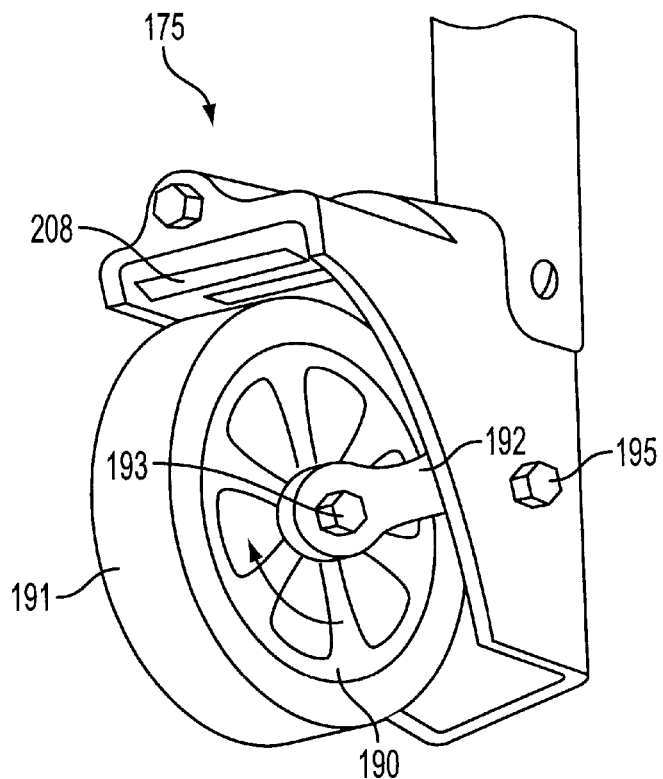
FIG. 13 is an oblique view of a wheel and brake assembly the inventive wheel assembly used with the rear legs of the FIG. 1 walker.
Figure 14:
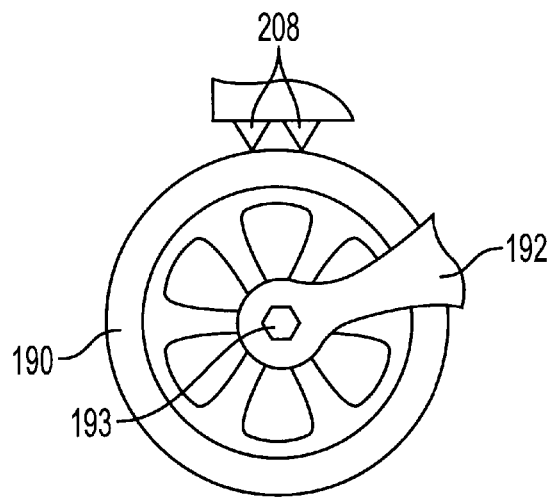
FIG. 14 is a semi-schematic side view of the wheel and brake assembly of FIG. 13.
Figure 15:
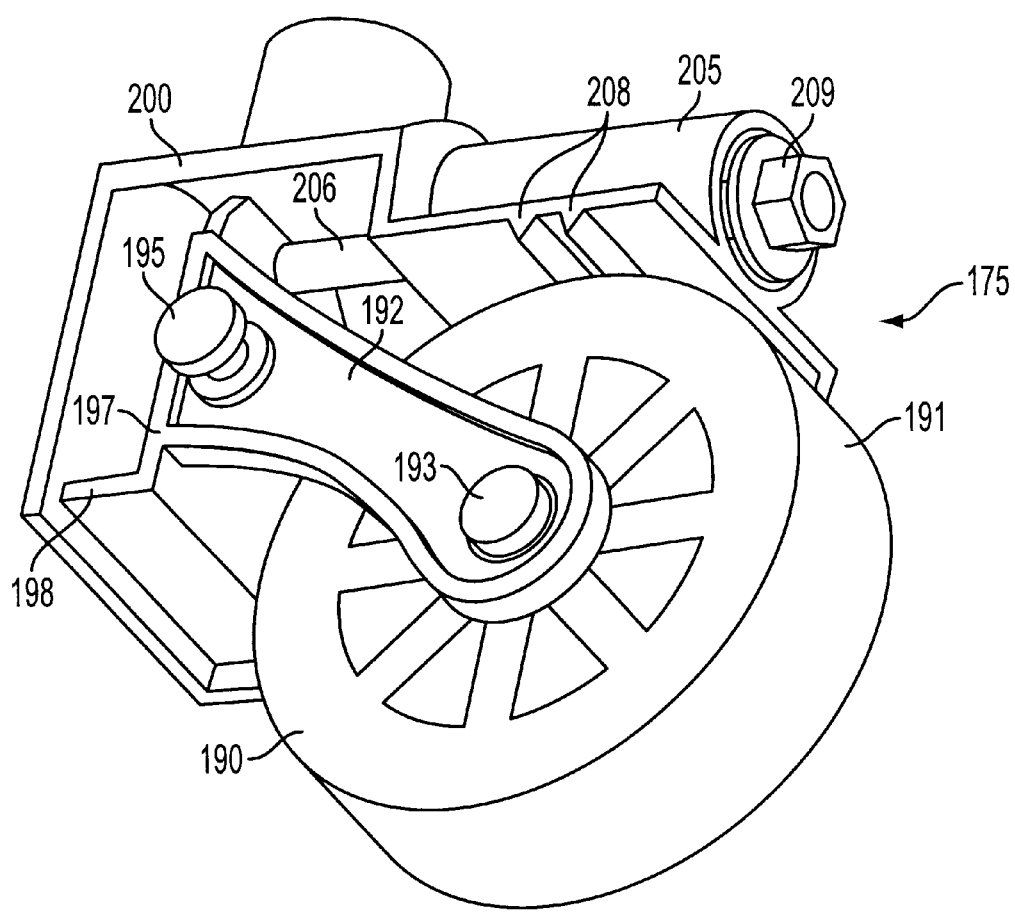
FIG. 15 is a second oblique, and partially broken away, view of the wheel and brake assembly of FIG. 13.

Turning once again to FIG. 1, now in relation to FIGS. 13, 14 and 15 as well, a preferred embodiment of this invention provides a wheel and brake assembly 175 that is mounted at the bottom of each rear leg member of walker 150. Referring specifically to FIGS. 13, 14, and 15, the assembly 175 includes a caster 190 having a relatively flat tread area 191 about the caster circumference. The caster is rotationally mounted between the arms of yoke 192 by means of axle 193 that extends between the yoke arms. Yoke 192 is cantilevered from pivot member 195 and is arranged so that a downward force exerted upon rear legs 170, 171 upon pivot 195 causes the yoke axle end and caster 190 to rise relative to the yoke pivot end.

Yoke 192 terminates at its pivot end in an L-shaped bracket having a vertical arm 197 and a horizontal stop member 198. Stop member 198 serves to limit the rotational travel of the yoke arms about pivot 195 by engagement with the inner side of the assembly housing 200. A spring or pneumatic resistance is contained within cylinder 205. That resistance acts through connecting rod 206, vertical arm 197, and yoke arms 192 to urge caster 190 downwardly in opposition to the upward force on the caster that is produced by a load upon the rear legs of walker 150. One or more brake pads 208 are mounted on the underside of assembly housing 200 at a location directly above caster axle 193. If enough downward force is applied to the rear legs the caster is urged upwardly to the point that caster tread 191 contacts and drags against brake pads 208 thus inhibiting or stopping rotation of the caster. That arrangement allows a user of the walker to apply a brake to the movement of the walker simply by pressing down on the handholds 155. It also acts as a safety feature to stop walker movement in the circumstance wherein the user of the walker loses balance, stumbles, or starts to fall. In a preferred embodiment of this invention, the magnitude of the force produced by resistance 205 is adjustable to fit the needs of individual users of the walker. Such adjustment may be obtained by an appropriate selection of the spring or pneumatic resistance member contained within housing 205, or through a threaded adjustment means 209 that acts to change the spring tension or pneumatic resistance.

The walker assembly of this invention together with the wheel assemblies used therewith have been shown and described with respect to certain preferred embodiments thereof and that description is for the purpose of illustration and not of limitation. Other variations and modifications of the described invention will be apparent to those skilled in the art and are included within the scope of the invention as set out in the appended claims.

I claim:

1. A walker comprising:

a walker frame, said frame having a left side member and a right side member, said left and right side members each having a downwardly extending front leg and a downwardly extending rear leg, said side members held rigidly spaced apart by a front frame member; and an obstacle traversing wheel assembly, that is arranged to roll on a surface, disposed at the lower end of each of said front walker legs, said wheel assembly comprising a primary wheel that is independently rotatable about a central axis, and an even number, but at least four, secondary wheels of equal diameter mounted at fixed locations on said primary wheel whereat at least two of said secondary wheels are in rolling contact with said surface, said fixed locations being equidistant from said central axis and angularly equidistant one from the next, the diameter of each said secondary wheel being greater than the distance between axes of angularly adjacent wheels, said adjacent wheels offset one to another whereby adjacent wheels follow separate but parallel paths, each of said secondary wheels arranged to freely rotate independently of any other secondary wheel and independently as well of said primary wheel.

2. The walker of claim 1 wherein each said wheel assembly is arranged to freely swivel about the axis of its respective walker leg.

3. The walker of claim 1 wherein the primary wheel of said wheel assembly comprises two parallel, spaced apart plates that support a plurality of axles extending inwardly therefrom, one axle for each secondary wheel.

4. The walker of claim 3 wherein said axles extend perpendicularly between said plates, and wherein one secondary wheel is mounted on each said axle.

5. The walker of claim 4 wherein each said secondary wheel includes a cylindrical, disk-shaped section having a generally flat, edge bearing surface, and having a cylindrical boss extending coaxially from one side thereof, the length of said boss being equal to or greater than the thickness of said disk-shaped section, and wherein adjacent secondary wheels are mounted such that the boss portion of each wheel is oriented in an opposite direction whereby adjacent wheels are caused to roll in two separate and parallel tracks.

6. The walker of claim 3 wherein said primary wheel comprises two parallel, spaced apart plates, said plates supporting a plurality of inwardly directed stub axles, one for each secondary wheel, wherein adjacent stub axles are mounted on opposite plates of said wheel holder, and wherein each secondary wheel is formed as a generally cylindrical disk, the maximum thickness of each secondary wheel being less than one-half the spacing between the two wheel holder plates.

7. The walker of claim 3 having six secondary wheels.

8. The walker of claim 3 having eight secondary wheels.

9. The walker of claim 1 wherein said primary wheel comprises a generally circular planar member having a plurality, but at least six, stub axles mounted at fixed locations thereon, one axle for each secondary wheel, wherein angularly adjacent stub axles extend outwardly from opposite sides of said plate, and wherein said secondary wheels are configured as a generally cylindrical disk, thereby causing each said pair of angularly adjacent secondary wheels to roll in separate and parallel tracks.

10. The walker of claim 9 wherein the diameter of each secondary wheel is greater than one-half the diameter of said primary wheel and wherein the distance between angularly adjacent secondary wheels is less than the diameter of a secondary wheel.

11. The walker of claim 1 wherein said primary wheel comprises a generally circular planar member having eight stub axles mounted at fixed locations thereon, one axle for each secondary wheel, and wherein angularly adjacent stub axles extend outwardly from opposite sides of said planar member.

12. The walker of claim 11 wherein the diameter of each secondary wheel is greater than one-half the diameter of said primary wheel and wherein the distance between angularly adjacent secondary wheels is less than the diameter of a secondary wheel.

13. The walker of claim 12 wherein four wheels are mounted on one side of said primary wheel and four wheels are mounted on the other side of said primary wheel, wherein the distance between adjacent stub axles mounted on the same side of said primary wheel is less than the diameter of a secondary wheel causing adjacent wheels on the same side of said primary wheel to overlap and follow adjacent and parallel tracks.

14. The walker of claim 1 having a wheel with braking means disposed at the lower end of each of said rear walker legs, said braking means engaged by applying a downward force on said walker frame.

15. The walker of claim 14 wherein said wheel is rotationally mounted between the arms of a yoke that is cantilevered from a pivot point and is arranged so that said downward force causes the wheel to rise relative to said pivoted yoke end and to thereby engage a brake pad that is fixed above said wheel.

16. The walker of claim 15 including a resistance that is arranged to urge said wheel downwardly in opposition to the upward movement of said wheel caused by application of said downward force to the walker frame.

17. A wheel assembly that is arranged to roll on a surface comprising:

a generally planar primary wheel that is rotatable about a central axis, said primary wheel comprising a generally circular planar member having a plurality of, but at least six, stub axles at fixed locations extending outwardly therefrom, said locations being angularly equidistant apart and equidistant as well from the central axis, said stub axles arranged so that angularly adjacent axles extend outwardly from opposite sides of said planer member; and an even number of secondary wheels, one wheel mounted on each stub axle, said secondary wheels being of equal size and configured as a generally cylindrical disk having a diameter greater than the distance between angularly adjacent stub axles, said axles and wheels arranged such that at least two angularly adjacent wheels are in rolling contact with said surface at any one time, each of said secondary wheels arranged to freely rotate independently of any other secondary wheel, and independently as well of said primary wheel whereby each wheel of an angularly adjacent pair of wheels that is in rolling contact with said surface rolls in a separate and parallel track.

18. The wheel assembly of claim 17 wherein the diameter of each secondary wheel is greater than one-half the diameter of said primary wheel and wherein the distance between angularly adjacent secondary wheels is less than the diameter of a secondary wheel.

19. The wheel assembly of claim 17 wherein eight stub axles are mounted on said primary wheel, one axle for each secondary wheel, wherein angularly adjacent stub axles extend outwardly from opposite sides of said primary wheel, wherein the diameter of each secondary wheel is greater than one-half the diameter of said primary wheel, and wherein the distance between angularly adjacent stub axles is less than the diameter of a secondary wheel.

20. The wheel assembly of claim 19 wherein four wheels are mounted on one side of said primary wheel and four wheels are mounted on the other side of said primary wheel, and wherein the distance between adjacent stub axles mounted on the same side of said primary wheel is less than the diameter of a secondary wheel causing adjacent wheels on the same side of said primary wheel to overlap and follow adjacent and parallel tracks.

* * * * *